United States Patent
Ruetschi et al.

(10) Patent No.: US 9,860,386 B2
(45) Date of Patent: Jan. 2, 2018

(54) COMMUNICATION APPARATUS AND METHOD

(71) Applicant: Unify GmbH & Co. KG, Munich (DE)

(72) Inventors: Johannes Ruetschi, Boca Raton, FL (US); Richard Abbotts, Nottinghamshire (GB); Christian Garbin, Boca Raton, FL (US); Gary Mora, Boca Raton, FL (US)

(73) Assignee: Unify GmbH & Co. KG, Munich (DE)

( * ) Notice: Subject to any disclaimer, the term of this patent is extended or adjusted under 35 U.S.C. 154(b) by 142 days.

(21) Appl. No.: 14/654,882

(22) PCT Filed: Jan. 22, 2013

(86) PCT No.: PCT/US2013/022472
§ 371 (c)(1),
(2) Date: Jun. 23, 2015

(87) PCT Pub. No.: WO2014/116198
PCT Pub. Date: Jul. 31, 2014

(65) Prior Publication Data
US 2015/0373198 A1    Dec. 24, 2015

(51) Int. Cl.
*H04M 3/42* (2006.01)
*H04M 3/54* (2006.01)
(52) U.S. Cl.
CPC ............. *H04M 3/543* (2013.01); *H04M 3/54* (2013.01); *H04M 2201/14* (2013.01)
(58) Field of Classification Search
CPC .............................. H04M 3/54; H04M 3/436
USPC ....................... 379/211.01–211.02
See application file for complete search history.

(56) References Cited

U.S. PATENT DOCUMENTS

2012/0165014 A1 * 6/2012 Ishihara ................. H04M 1/00
455/435.2

FOREIGN PATENT DOCUMENTS

| CN | 102714836 A | 10/2012 |
| EP | 1309133 A1 | 5/2003 |
| JP | 2010074600 A | 4/2010 |

(Continued)

OTHER PUBLICATIONS

International Search Report for PCT/US2013/022472 dated Nov. 4, 2013.

(Continued)

*Primary Examiner* — Rasha Al Aubaidi
(74) *Attorney, Agent, or Firm* — Buchanan Ingersoll & Rooney PC

(57) ABSTRACT

A second terminal sends a request to initiate a communication session with a first terminal to a server. The server signals the first terminal to initiate the communication session. The first terminal determines an offset amount based upon the redirection timer information. The offset amount is added to or subtracted from a redirection timer value to determine a modified redirection timer value that takes into account time that elapses between messaging exchanged between the server and the first terminal that affects the first terminal determination of an amount of time remaining in a redirection timer of the server such that the determined modified redirection timer value is equal in value or substantially equal in value to the amount of time remaining in the redirection timer of the server.

18 Claims, 5 Drawing Sheets

(56) References Cited

FOREIGN PATENT DOCUMENTS

WO 2007148037 A1 12/2007

OTHER PUBLICATIONS

Written Opinion of the International Searching Authority for PCT/US2013/022472 dated Nov. 4, 2013.

* cited by examiner

A server receives a communication session request directed from a second terminal device to a first terminal device and in response to this request signals the first terminal device regarding the communication session. Information relating to a redirection timer, redirection target, and when the redirection timer is initiated is included with the signaling or is sent in association with the signaling.

↓

The first terminal device receives the signaling from the server

↓

In response to the received signaling, the first terminal device determines an offset amount based on a time that elapses between when a message is sent from the server to when that message is received by the first terminal device or vice versa. The offset amount is then either added or subtracted from the redirection timer amount to determine a real-time modified redirection timer to display via a display device of the first terminal device so a user may be informed as to how much time is left for the user to answer the communication session or otherwise act to affect redirection of the communication session.

↓

The first terminal device sends a pause message to the server to pause the redirection timer in response to input received from a user.

↓

The server responds to the pause message by pausing the redirection timer.

↓

The first terminal device sends a resumption message to the server so that the server will resume counting down of the redirection timer. The first terminal device also determines an offset associated with the resumption message and applies that offset for purposes of displaying the resumed countdown of the redirection timer of the server.

FIGURE 4

COMMUNICATION APPARATUS AND METHOD

FIELD OF INVENTION

The present invention relates to communication devices, communication systems, and methods of using communication apparatuses. For instance, one embodiment of a communication apparatus includes a communication device that is configured to provide a sufficient amount of time for purposes of redirecting a communication session from one terminal device to another terminal device.

BACKGROUND OF THE INVENTION

A call to a telephone may be forwarded to another device. As an alternative to call forwarding, workflow redirection of a communication session may be effected by a server that provides a redirection service to a user associated with multiple communication terminals. The server may redirect a communication session based upon a timer expiring or based upon a preference set by the user, for example. The redirection may occur automatically.

Sometimes, a redirection of a communication session occurs automatically when a user does not have sufficient time to establish the communication session at the preferred terminal device. Other times, a user may be unable to re-route or change how a communication session is redirected. Such issues have become increasingly important as many businesses transition to a bring your device to work strategy for managing communication resources.

We have determined that a new method or mechanism is needed to permit a user to obtain additional time for purposes of redirecting a communication session or otherwise controlling the routing of a communication session directed to the user. Preferably, embodiments of our communication apparatus is configured to permit a user to obtain sufficient time for controlling the redirecting of a communication session directed to that user.

SUMMARY OF THE INVENTION

A method, system, non-transitory computer readable medium, terminal device, and communication apparatus are provided. Embodiments of our method for establishing a communication session between a first terminal device and a second terminal device may include the steps of the second terminal device sending a request to initiate a communication session with the first terminal device to a server and the server signaling the first terminal device to initiate the communication session. The server may send at least one of redirection target information and redirection timer information in association with the signaling. The first terminal device may then determine an offset amount based upon the redirection timer information. The offset amount may be added or subtracted to a redirection timer value to determine a modified redirection timer value that takes into account time that elapses between messaging exchanged between the server and the first terminal device that affects the first terminal device determination of an amount of time remaining in a redirection timer of the server such that the determined modified redirection timer value is equal in value or substantially equal in value to the amount of time remaining in the redirection timer of the server. The first terminal device displays the modified redirection timer value when outputting an indication of the received signaling for initiating the communication session.

In some embodiments of the method, the redirection timer information is comprised of information identifying an initial starting time of the redirection timer of the server. The server may count down time from the initial starting time. The server may initiate the counting down of the redirection timer of the server upon sending of the signaling of the first terminal device or the server receiving confirmation from the first terminal device that confirms receipt of the signaling sent by the server. The first terminal device may display indicia identifying a target device to which a redirection of the communication session is to be directed upon expiration of the redirection timer of the server. The redirection timer information may also comprise information indicating that the server initiates counting down of the initial starting time of the redirection timer of the server upon one of (a) receipt of confirmation of the signaling sent to the first terminal device and (b) the sending of the signaling of the first terminal device.

The offset amount may be determined in a number of different ways. For instance, the first terminal device may identify an amount of registration time that elapsed between when a registration request message was sent from the first terminal device to the server and when a registration response message sent by the server that responded to the registration request message was received by the first terminal device and dividing the amount of registration time in half to identify a value for the offset amount.

Embodiments of the method may also include additional steps. For instance, the first terminal device may count down the modified redirection timer value and display the counting down of the modified redirection timer value.

As another example, the method may include the steps of the first terminal device receiving input to pause counting down of the redirection timer of the server and the first terminal device sending a pause message to the server such that the server pauses counting down the redirection timer of the server. In certain embodiments, the offset amount may be a first offset amount and the method may also include the steps of the first terminal device receiving input to resume counting down of the redirection timer of the server, and the first terminal device sending a resume message to the server such that the server ceases the pausing of the counting down of the redirection timer of the server and resumes the counting down of the redirection timer of the server. The first terminal device may also determine a second offset amount, that is added or subtracted to a paused value of the modified redirection timer to take into account time that elapses between messaging exchanged between the server and the first terminal device that affects the first terminal device determination of an amount of time remaining in the redirection timer of the server and subsequently resuming counting down of the modified redirection timer value and displaying indicia identifying the counting down of the modified redirection timer value. The first terminal device may alternatively resume counting down of the modified redirection timer value after an amount of time equivalent to the first offset amount passes and display indicia identifying the counting down of the modified redirection timer value. As yet another alternative, the first terminal device may determine a second offset amount to take into account time that elapses between messaging exchanged between the server and the first terminal device that affects the first terminal device determination of an amount of time remaining in the redirection timer of the server and resuming counting down of the modified redirection timer value after an amount of time equivalent to the second offset amount passes.

In some embodiments of the method, the first offset amount may be equal to a value that is half of an amount of time that elapsed between when the first terminal device sent a registration request message to the server and when the first terminal device received a registration response message from the server. The second offset amount may be equal to the amount of time that elapsed between when the first terminal device sent the registration request message to the server and when the first terminal device received the registration response message from the server In some embodiments of the method, the first terminal device may be configured to request the redirection timer to have additional time added to it. For instance, the first terminal device may determine a state of the first terminal device when the signaling from the server to initiate the communication session is received. Upon a determination that the state of the first terminal device is a predefined state to which additional redirection time is needed, the first terminal device may send an additional time message to the server such that the server adds a predetermined amount of time to the redirection timer so that an amount of time remaining in the redirection timer includes the predefined amount of time identified in the additional time message. In some embodiments, the additional time message may be a confirmation message sent to the server that includes information requesting that additional time be added to the redirection timer.

A communication system is also provided. The communication system may include a first terminal device and a server communicatively connectable to the first terminal device. The server may signal the first terminal device to initiate a communication session requested by a second terminal device. The server sends at least one of redirection target information and redirection timer information in association with the signaling. The first terminal device determines an offset amount based upon the redirection timer information. The offset amount is added or subtracted to a redirection timer value to determine a modified redirection timer value that takes into account time that elapses between messaging exchanged between the server and the first terminal that affects the first terminal device determination of an amount of time remaining in a redirection timer of the server such that the determined modified redirection timer value is equal in value or substantially equal in value to the amount of time remaining in the redirection timer of the server. The first terminal device may display the modified redirection timer value when displaying an indication of the received signaling for initiating the communication session.

In some embodiments of the system, the offset amount is a first offset amount and the first terminal device receives input to pause counting down of the redirection timer of the server and subsequently sends a pause message to the server such that the server pauses counting down the redirection timer of the server. The first terminal device may receive input to resume counting down of the redirection timer of the server and subsequently send a resume message to the server such that the server ceases the pausing of the counting down of the redirection timer of the server and resumes the counting down of the redirection timer of the server. The first terminal device may determine a second offset amount that is added or subtracted to a paused value of the modified redirection timer to take into account time that elapses between messaging exchanged between the server and the first terminal device that affects the first terminal device determination of an amount of time remaining in the redirection timer of the server and subsequently resuming counting down of the modified redirection timer value and displaying indicia identifying the counting down of the modified redirection timer value. Alternatively, the first terminal device may resume counting down of the modified redirection timer value after an amount of time equivalent to the first offset amount passes and may also display indicia identifying the counting down of the modified redirection timer value. As yet another alternative, the first terminal device may determine a second offset amount to take into account time that elapses between messaging exchanged between the server and the first terminal device that affects the first terminal device determination of an amount of time remaining in the redirection timer of the server and resume counting down of the modified redirection timer value after an amount of time equivalent to the second offset amount passes.

In some embodiments of the system, the first offset amount may be equal to a value that is half of an amount of time that elapsed between when the second terminal device sent a registration request message to the server and when the second terminal device received a registration response message from the server. The second offset amount may be equal to the amount of time that elapsed between when the first terminal device sent the registration request message to the server and when the first terminal device received the registration response message from the server Embodiments of a non-transitory computer readable medium having an application stored thereon may be configured so that the application is executable by a terminal device. The application can define a method performed by the terminal device when the terminal device executes the application. The method may include the steps of the terminal device receiving signaling from a server to initiate a communication session requested by another terminal device, the terminal device receiving at least one of redirection target information and redirection timer information in association with the received signaling, and the terminal device determining an offset amount based upon the redirection timer information. The offset amount may be added or subtracted to a redirection timer value to determine a modified redirection timer value that takes into account time that elapses between messaging exchanged between the server and the terminal device that affects the terminal device determination of an amount of time remaining in a redirection timer of the server such that the determined modified redirection timer value is equal in value or substantially equal in value to the amount of time remaining in the redirection timer of the server. The terminal device displays the modified redirection timer value when displaying an indication of the received signaling for initiating the communication session.

In some embodiments, of the non-transitory computer readable medium may be configured so that the method defined by the application also includes the steps of the terminal device receiving input to pause counting down of the redirection timer of the server, the terminal device sending a pause message to the server such that the server pauses counting down the redirection timer of the server, the terminal device receiving input to resume counting down of the redirection timer of the server, and the terminal device sending a resume message to the server such that the server ceases the pausing of the counting down of the redirection timer of the server and resumes the counting down of the redirection timer of the server. The method may also include the step of the terminal device determining a second offset amount. The second offset amount may be added or subtracted to a paused value of the modified redirection timer to take into account time that elapses between messaging exchanged between the server and the terminal device that affects the first terminal device determination of an amount of time remaining in the redirection timer of the server and subsequently resuming counting down of the modified redirection timer value and displaying indicia identifying the counting down of the modified redirection timer value. Alternatively, the terminal device may resume counting down of the modified redirection timer value after an amount of time equivalent to the first offset amount passes and displaying indicia identifying the counting down of the modified redirection timer value. As yet another alternative, the terminal device may determine a second offset amount to take into account time that elapses between messaging exchanged between the server and the terminal device that affects the terminal device determination of an amount of time remaining in the redirection timer of the server and resuming counting down of the modified redirection timer value after an amount of time equivalent to the second offset amount passes.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred communication systems, communication terminals, and communication devices are shown in the accompanying drawings and certain present preferred methods of practicing or making the same are also illustrated therein. It should be understood that like reference numbers used in the drawings may identify like components.

FIG. 4 is a flow chart of a first exemplary method of using an embodiment of our communication apparatus.

DETAILED DESCRIPTION OF EXEMPLARY EMBODIMENTS

Figure 1:
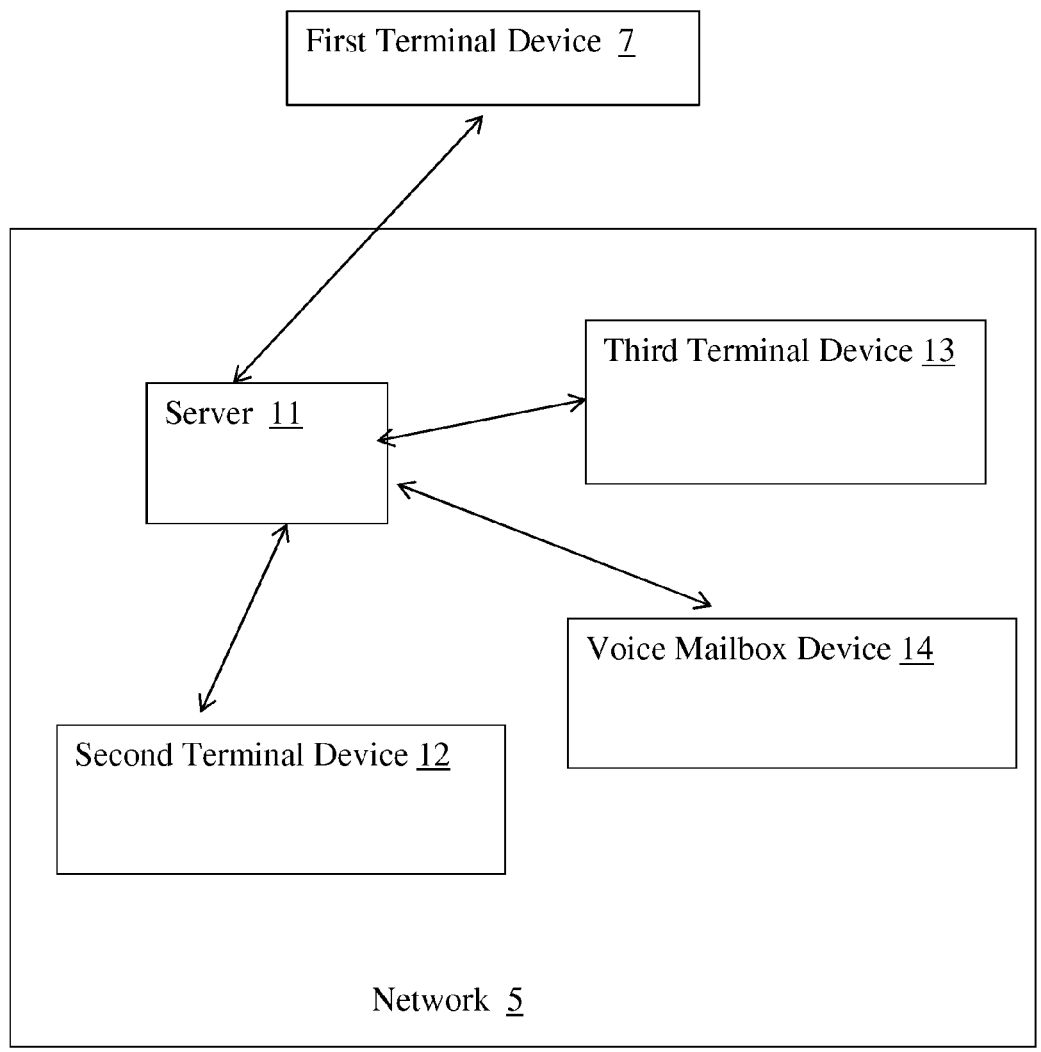
FIG. 1 is a block diagram of an exemplary embodiment of a communication system.
Figure 2:
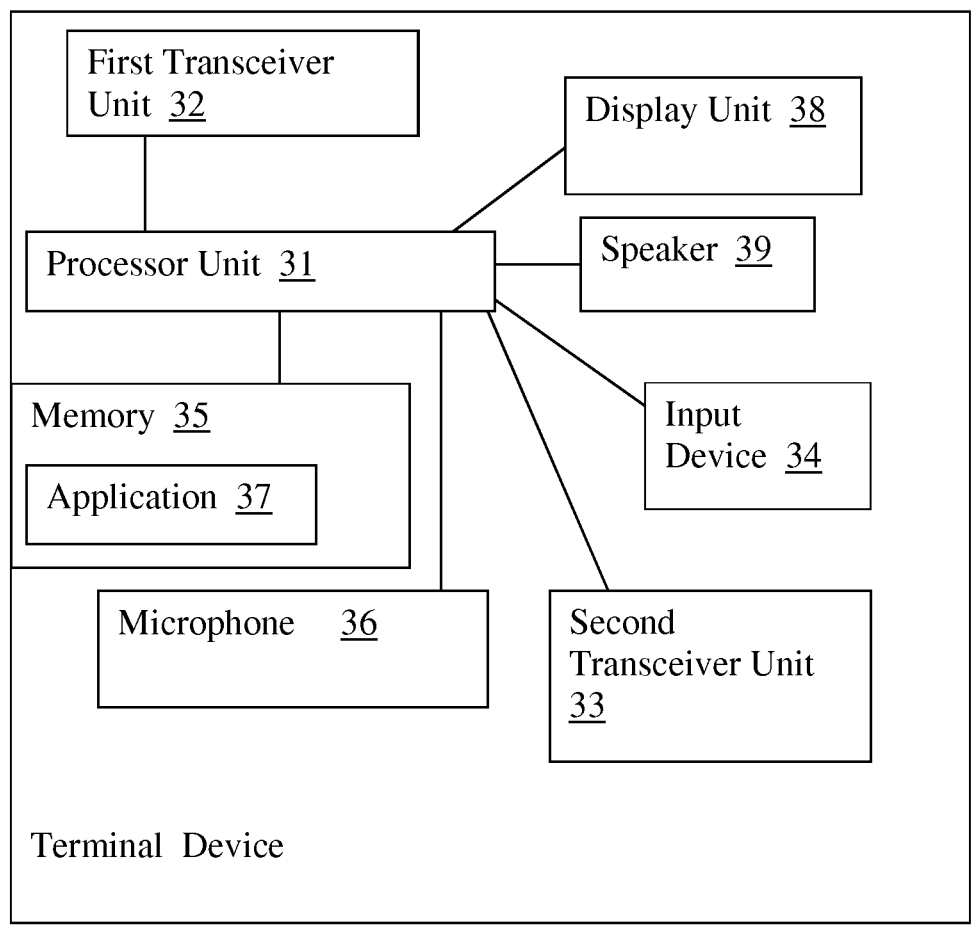
FIG. 2 is a block diagram of an exemplary embodiment of a communication terminal that is utilized in embodiments of our communication apparatus such as an embodiment of a communication system or an embodiment of a communication terminal.
Figure 3:
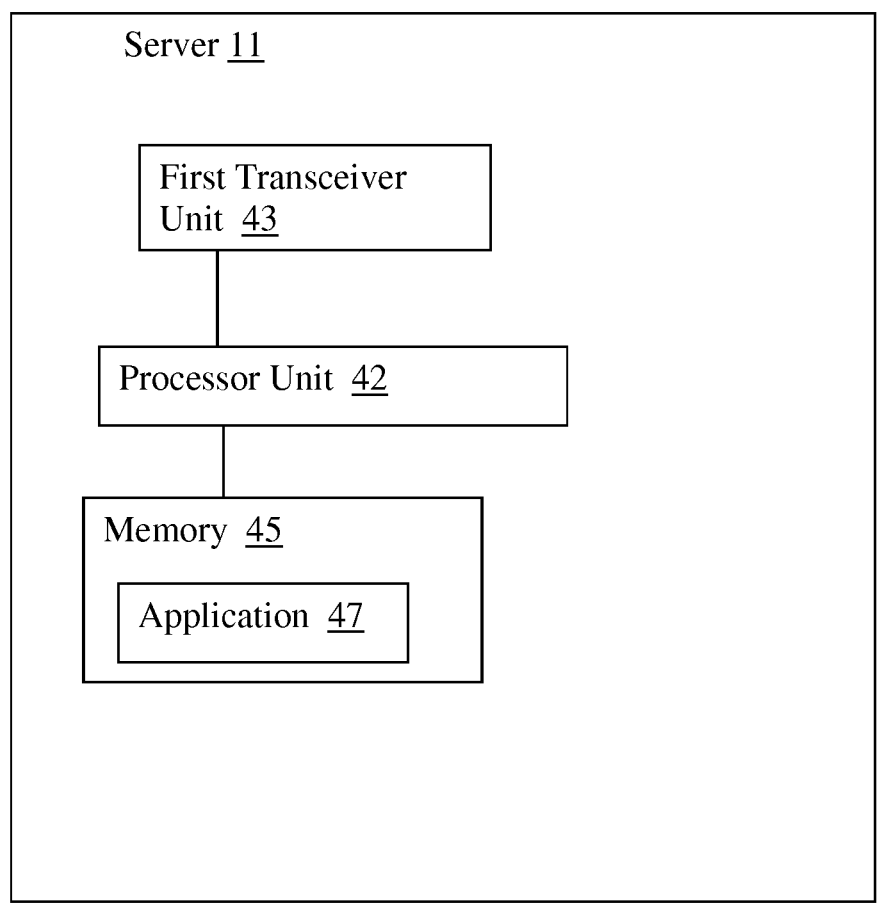
FIG. 3 is a block diagram of an exemplary embodiment of a server that may be utilized in embodiments of our communication apparatus such as an embodiment of a communication system.
Figure 5:
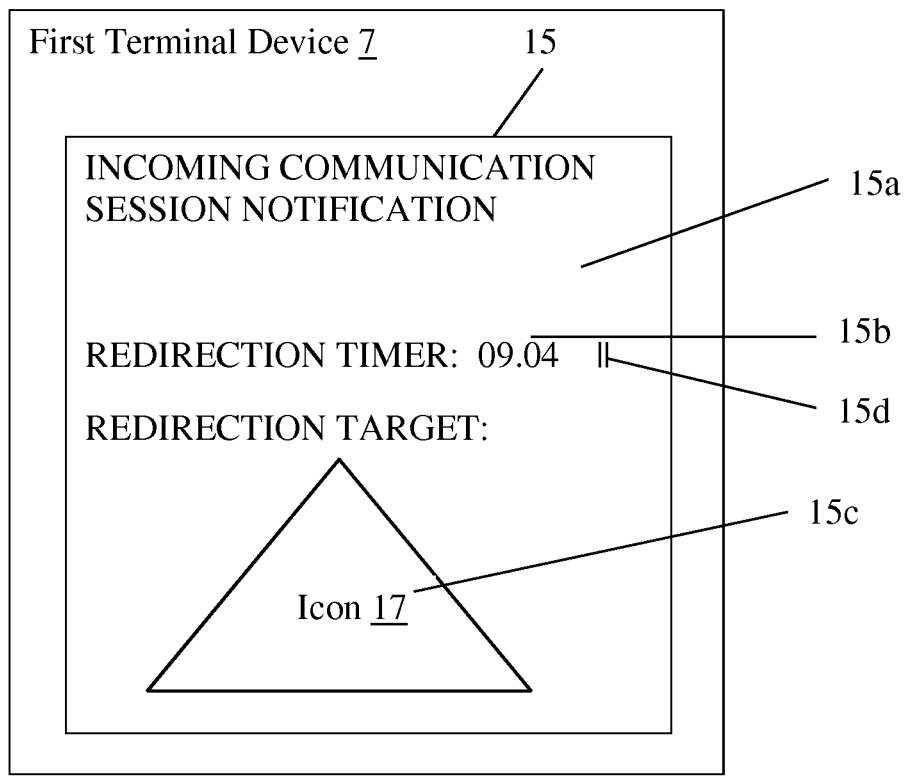
FIG. 5 is a block diagram of the first terminal device illustrating an exemplary display including indicia indicating an incoming communication session request, a redirection timer, and redirection target.

Referring to FIGS. 1-6, a communication apparatus such as a communication system may include a first terminal device 7 that is communicatively connectable to a server 11. The server 11 may be part of a network 5 such as a wide area network or local area network. The first terminal device 7 may be connected to the network via a communication connection the first terminal device 7 forms with the server 11. Such a communication connection may include a path of communication that traverses an access point (not shown) as well as other network nodes to define the communication path between the first terminal device 7 and the server 11. In some embodiments, an access point such as a router or base station or wireless access point to which the first terminal device 7 is registered with and connected to will provide a network connection for the first terminal device 7 so the first terminal device 7 can communicate with the network 5, nodes of the network 5, and other terminal devices connected to the network 5.

The server 11 may be a communications server that hosts a service for redirection communication sessions such as voice calls or video calls. In one embodiment, the server may be a computer device that provides switch functionality such as a softswitch or a private branch exchange. A second terminal device 12 may be connected to the server 11 to establish a communication session with the first terminal device 7. A third terminal device 13 may also be communicatively connectable to the server 11.

The first terminal device 7, second terminal device 12, and third terminal device 13 may each be a tablet, a mobile cellular phone, an internet appliance, a laptop computer, a smart phone, a personal digital assistant, a mobile computer device, or other communication terminal. The first, second, and third terminal devices may each include a processor unit 31 that is communicatively connected to a first transceiver unit 32, a second transceiver unit 33, at least one input device 34, memory 35, a microphone 36, a display unit 38 and a speaker 39. The first transceiver unit 32 may include a receiver unit and a transmitter unit for transmission and reception of data via a cellular network, a wireless network connection, or other network connection. The second transceiver unit 33 may be configured to form a wireless connection via a near field communication, a Bluetooth compliant communication, or other type of wireless communication mechanism or permit a wired connection via a universal serial bus connection, for example. In some embodiments, the terminal device may include additional transceiver units as well.

The processor unit 31 may be a central processing unit such as a microprocessor, interconnected microprocessors, or other hardware processor element. The memory 35 may be a non-transitory computer readable medium that has at least one application 37 stored thereon that defines a method that is performed by the terminal device. The memory 35 may include a hard drive, a flash drive, an optical disk or a hard disk or other type of computer readable medium that can stores data for a non-transitory period of time. The speaker 39 may emit audio and the microphone 36 may be an input device that records audio emitted by a user for receiving that audio data. The display unit 38 may be a liquid crystal display or other display device. The display unit 38 may be configured as a touch screen display that functions to output data visually while also permitting a user to provide input by touching different portions of the display. The input device 34 may be a button, keyboard, mouse, or other type of input device a user may utilize to provide input.

The server 11 may include a first transceiver unit 43 that is communicatively connected to a processor unit 42. The processor unit 42 may also be connected to memory, such as non-transitory memory. The memory 45 may have at least one application 47 stored thereon. The application can include program code that defines instructions that define a method that the server 11 performs when the processor unit 42 executes the application 47. It should be understood that the memory 45 may also include one or more databases or other data that contains information that may be accessed to route calls, redirect communications, or provide other services hosted by the server 11. The first transceiver unit 43 may be configured to permit communications to be established between the server 11 and multiple communication terminal devices so that one or more communication sessions may be established and maintained in response to a request to call or otherwise form a communication session with another device that is received by the server 11.

In some embodiments, the server 11 may receive a request from a second terminal device 12 to establish a call or other communication session connection with the first terminal device 7 or with the user associated with the first terminal device 7. The server may signal to the first terminal device 7 to establish the call or other communication session. The signaling to the first terminal device 7 may include a data packet or message that includes a private header that identifies the state of the signaling (e.g. initiated, trying, ringing, etc.) and a redirection target, which may be one or more other terminal devices to which the user of the first terminal device is associated such as a third terminal device 13. The redirection target may be identified by any of a number of indicia, such as a predefined code word representing a device associated with a user that is preset by the user, an address of the device, or other type of indicator. As another option, the signaling for the communication session redirection may be in a separate message sent to the first terminal device along with the signaling for the communication session that is formatted in extensible markup language ("XML") as private data in a user agent computer-supported telecommunications application ("CSTA") delivered event.

The server 11 may start a redirection timer for redirecting the communication session to the third terminal device 13 or other device upon the sending of the signaling for the communication session to the first terminal device 7. Alternatively, the redirection timer may be started after the server receives signaling or one or more data packets from the first terminal device 7 indicating that the first terminal device 7 confirms receipt of the signaling for the communication session that was sent by the server 11. If no answer to the signaling is received from the first terminal device 7 and no information indicating a redirection to another terminal device is received when the redirection timer expires, the server 11 may start signaling the third terminal device 13 for establishing the communication session.

Alternatively, the server may redirect the communication session to a voice mailbox device 14 associated with the user of the first terminal device or a voice mailbox device 14 that is associated with the first terminal device 7 if no answer to the signaling of the communication session request is received. A user of the second communication terminal 12 may leave a message for the user of the first communication terminal that is received by the voice mailbox device 14 and subsequently stored in the memory of that device. The voice mailbox device may also, or alternatively, transmit the recorded message to the first terminal device 7 as audio data for saving in memory of the first terminal device 7 or as a transcribed text file for saving in the memory of the first terminal device.

The amount of time remaining in the redirection timer at the time of the signaling may also be included in the signaling or in a message associated with such signaling. Alternatively, an indication that a redirection timer will start upon confirmation of receipt of the signaling may be included in the signaling or the message sent in association with the signaling. In yet another embodiment, no indication of a redirection timer will be provided and the first terminal device may merely be configured to know the value of a redirection timer and when that timer will be started upon a preset configuration previously communicated to the first terminal device 7 by the server 11 or other device such as during registration with the server 11 or in messages that are exchanged periodically between the server 11 and first terminal device 7 after registration with the server 11 occurs.

Upon the first terminal device 7 receiving the signaling of the incoming communication session from the server 11, the first terminal device 7 may determine an amount of time remaining in the redirection timer of the server 11. Exemplary methods by which an amount of time of a redirection timer is determined and the display of such an amount of time and the subsequent countdown of the timer may be appreciated from FIG. 4 and an exemplary display that includes a redirection timer countdown that is displayable to a user of the first terminal device is provided in FIG. 5.

To make an accurate determination as to what amount of time remains on the redirection timer of the server 11, the first terminal device may need to determine an offset amount needed to take into account for the timer based on the redirection timer amount that may be indicated in association with that signaling. The offset amount may need to take into account latency within the network 5 that accounts for the amount of time it takes for signaling or messages to be transmitted between the server 11 and the first terminal device 7. For example, the offset amount may need to take into account latency within the network 5 that accounts for the amount of time it takes for signaling or messages to be transmitted from the first terminal device 7 to the server 11. As another example, the offset amount may need to take into account the latency within the network to account for an amount of time it takes for signaling or a message to be transmitted from the server 11 to the first terminal device 7. The amount of time lost to latency may be significant and can depend on a number of factors such as how many nodes are within a communication path between the server 11 and first terminal device 7 and the type of communication connection that is formed or formable between the server 11 and the first terminal device 7.

To make the redirection timer offset determination, the first terminal device may determine an offset amount based on a measured registration time that elapsed between when a registration request was sent from the first terminal device 7 to the server 11 and when a registration response to the registration request that was sent from the server 11 was received by the first terminal device 7. This amount of registration time may be used to determine an offset amount of time remaining in the redirection timer. For instance, the registration time may be divided by two, or halved, to determine an offset amount as the registration messaging involves two messages sent between the first terminal device 7 and the server 11, a message sent to the server 11 and a message received from the server 11. The offset amount may then be subtracted from the redirection timer amount included with the signaling of the communication session or otherwise sent in association with this signaling if the redirection timer is initiated upon a sending of that signaling. The offset amount may alternatively be added to the redirection timer amount that will be used by the server in the event the redirection timer is only started after the server receives confirmation from the first terminal device 7 of the signaling sent to the first terminal device 7.

It should be understood that the determined offset amount is used by the first terminal device so that the first terminal device is able to factor in the impact of latency within the network to more accurately determine a value of the redirection timer of the server. The redirection timer value determined by the first terminal device using the offset amount is preferably as accurate as possible. It is contemplated that the offset amount should permit the first terminal device to determine a value of the redirection timer of the server that substantially accurate (e.g. within 95% or within 90% of the redirection timer used by the server).

In some instances, the first terminal device may be configured to request the server to add additional time to the redirection timer of the server to account for a particular state in which the first terminal device is in when it receives the signaling to imitate the communication session from the server 11. For instance, the first terminal device 7 may be in a screen lock state when it receives the signaling to initiate the communication session from the server 11. In response to such a determination of its state and the received signaling to initiate the communication session, the first terminal device 7 may send an additional time message to the server 11 to request that the redirection timer of the server 11 have time added to the redirection timer. The amount of time may be a predetermined amount of time such as two seconds, four seconds, thirty seconds, or other time amount to account for time it may take a user to provide input to the first terminal device regarding a redirection of the communication session in view of the state of the first terminal device (e.g. screen lock state, sleep state, logged-off state, etc.). The additional time request message may alternatively be within a confirmation message sent to the server 11 to confirm receipt of the signaling for initiating the communication session. The confirmation message may include information that requests additional time to be added to the redirection timer. Upon receiving the information from the first terminal device 7 requesting additional time to be added to the redirection timer, the server 11 may have that amount of time added as requested so that the redirection timer amount includes the amount of time requested to be added to the redirection timer.

After the offset amount is determined and added to or subtracted from the initial redirection timer amount the first terminal device 7 understands the server 11 to be using (e.g. from a predetermined timer amount known to the terminal device or from a timer amount communicated to the terminal device with the signaling or message sent in association with the signaling), and any additional time that may be requested for adding to the redirection timer is also added to this redirection timer amount, the first terminal device 7 will display the modified redirection timer amount via its display unit to a user. The display unit of the first terminal device 7 may include a display 15 that outputs visible indicia 15*a* that provide an indication that an incoming communication session is received by displaying a visual indication of such signaling. Additionally, the first terminal device 7 may emit an audible sound such as a ring, may vibrate, or may perform a combination of such indicators to indicate the received communication session request.

The display of the first terminal device 7 may also display a window or indicia for a user to provide input for unlocking access to the device. For instance, the redirection display may be shown while a lock screen or log-on screen for a terminal device is shown on its display. A user may be able to provide input relating to redirection timer (e.g. pausing of the redirection timer or changing of a redirection target) or the answering of a communication session request such as a phone call while the lock screen is shown and prior to the user entering input to unlock the screen or otherwise validly log-on to use of most of the device's functionality via entering proper authorization input.

Along with the display 15 indicating that the communication session is being requested, the display 15 can include second visible indicia 15*b* that indicate an amount of time left for the user to answer the call prior to a redirection to a redirection target occurring. The display 15 can also include third visible indicia 15*c*, which may include an icon 17 indicating which other device associated with the user to which the call or other communication session is to be redirected upon the redirection timer expiring (e.g. counting down to zero) may also be displayed to the user (e.g. icon 17 representing the voice mail box 14 or the third terminal device 13). The user may then factor this redirection timer amount and redirection target information into his or her determination as to how to respond to the call or other communication session request.

For instance, the user may not respond to the call or other communication session request and allow the call to be redirected as preconfigured. Alternatively, the user may determine that he or she wants to redirect the communication session to another device other than the redirection device indicated in the display of the first terminal device. To change the target device to which the communication session should be redirected, the user may provide input to the first terminal device to adjust the redirection target setting. In some situations, the user may need more time than what is remaining in the redirection timer to effectuate such a change or to answer the communication session utilizing the first terminal device.

The user may pause the redirection timer by providing input to the first terminal device that is then provided within a message sent to the server to cause the redirection timer of the server 11 to be paused so that no further time is reduced from the redirection timer while the timer is paused. Alternatively, the input may simply cause such a message to be sent to the server to cause the redirection timer of the server to be paused. Indicia 15*d* could be displayed on the display to indicate a pausing of the redirection timer can be actuated and a user may press this icon shown on the display 15 to provide pause input.

The pausing of the redirection timer may be for an indefinite, or undefined, period of time or may be for a predetermined amount of time. For instance, the pause time period may be indefinite such that server 11 pauses the redirection timer after receiving the pause message from the first terminal device 7 and maintains the pausing of the redirection timer until receiving another message from the first terminal device 7 that causes the server 11 to resume counting down the redirection timer or indicates that the communication session has been answered or otherwise handled in such a way that eliminated the need for a redirection of the communication session.

The pausing of the redirection timer may alternatively occur for a predetermined amount of time. For instance, the pause message sent by the first terminal device 7 may define a predetermined amount of time in which the redirection timer is to be paused. After that time period passes, the server 11 may then resume the counting down of the redirection timer. If a user wishes to again have the redirection timer paused, he or she may again provide input to the first terminal device 11 to cause another pause message to be sent to the server 11 to again pause the redirection timer for a predetermined period of time. The user may provide pause input multiple times or the first terminal device 7 may be configured so that the user can only provide pause input a limited number of times such as once or twice.

Figure 6:
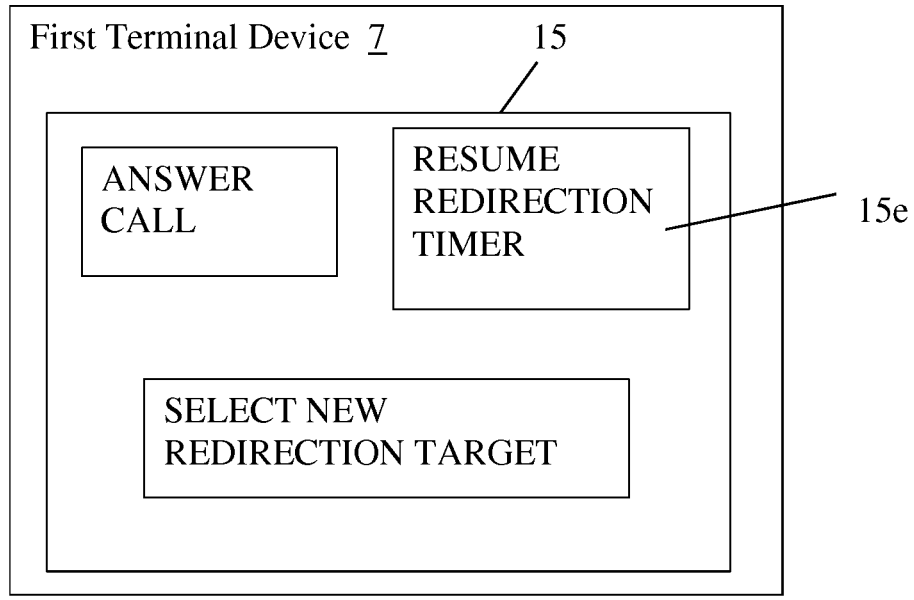
FIG. 6 is a block diagram of the first terminal device illustrating an exemplary display including indicia that indicates a resumption of a redirection timer countdown can be actuated.

After the redirection timer is paused via entered pause input, new indicia may be shown to the user or a new graphic may be displayed via the display as shown in FIG. 6 so that a user may provide input by pressing a touch screen displayed button to answer the communication session or may actuate indicia on the display to provide input to the first terminal device to reassign the target device for the redirection of the communication session upon expiration of the timer. If the user desires the redirection timer to be resumed, he or she may provide input to the first terminal device 7 via pressing an icon or other indicia 15e displayed on the display 15, or may manipulate a button, or other input device to provide input to actuate the sending of a message to the server 11 to resume the redirection timer countdown. The first terminal device 7 may also resume the display of the redirection timer counting down upon receipt of such resumption input after accounting for any pause and restart offset amount that may be needed to address the impact network latency may have on the redirection timer value that may affect the display of the resumed counting down of the redirection timer.

For embodiments where the redirection timer is paused for a predetermined amount of time, the first terminal device may simply resume the redirection timer counting down after that time has passed as corrected for by any offset amount needed to account for network latency involved in sending the pause message to the server 11. The time correction for the predetermined amount of time in which the pause period is to last may be calculated by using the offset amount calculation method noted above or may simply re-use the determined offset amount for correcting the predetermined pause time period to account for network latency delaying the server's receipt of the pause message.

For embodiments where the redirection timer is paused for a undefined period of time and is paused from when the server 11 receives a pause message to a time when the server receives a message from the first terminal device 7 indicating that the redirection timer should continue counting down, the pause related offset amount may be determined to account for network latency that may delay the messaging sent from the first terminal device 7 to the server 11 to initiate the pausing and restarting of the redirection timer. For example, prior to resuming the redirection timer countdown display by the first terminal device 7, the first terminal device may apply a determined offset amount to the displayed redirection timer before resuming the counting down of the displayed timer or may only resume counting down the displayed redirection timer amount after a resumption of redirection countdown offset amount of time passes to again account for network latency between when the messaging to the server for pausing and resuming the redirection timer countdown was sent to the server 11 and when that messaging was actually received and acted on by the server 11. The offset amount used for the resumption of the paused redirection timer countdown display may be a value that is determined similarly to how the above noted offset amount was determined.

For instance, the redirection timer pause and resumption offset amount value may be determined based on the measured registration time that elapsed between when a registration request was sent from the first terminal device 7 to the server 11 and when a registration response to the registration request that was sent from the server 11 was received by the first terminal device 7. This amount of registration time may be used to determine an offset amount of time remaining in the redirection timer. For instance, the registration time may be used to determine an offset amount as the registration messaging involves two messages sent between the first terminal device 7 and the server 11, a message sent to the server 11 and a message received from the server 11 and the pausing and restarting of the redirection timer may involve two messages sent from the first terminal device 7 to the server 11. The pause and resumption offset amount may then be added to the redirection timer amount prior to resuming the counting down of the redirection timer upon receipt of input from a user requesting the redirection timer to no longer be paused. Alternatively, the determined pause and resumption offset amount may define a time period in which the first terminal device 7 waits or delays prior to resuming the counting down of the previously shown redirection timer value so that the previously shown redirection timer value is not visibly altered to the user to avoid possibly confusing a user.

It should be appreciated that a number of variations to the above noted terminal devices, communication devices, communication systems and other communication apparatus may be made. Additionally, it should be understood that other steps to the above noted and illustrated methods may be included in embodiments of our method. For example, the server may be any type of computer device that hosts a service for forming or helping to establish communication sessions or for controlling the redirection of communication sessions. As another example, the terminal devices may each be a computer device such as a telephony device, a computer device such as a desktop computer, or a mobile computer device such as a tablet, laptop computer, or smart phone. As yet another example, the network 5 may be a wide area network or local area network that includes wired communication paths, wireless communication paths, and communication paths that include a combination of wired and wireless communication paths between intermediate network nodes.

While certain present preferred embodiments of the communication terminal, communication system, and methods of making and using the same have been shown and described above, it is to be distinctly understood that the invention is not limited thereto but may be otherwise variously embodied and practiced within the scope of the following claims.

What is claimed is:

1. A method of establishing a communication session between a first terminal device and a second terminal device comprising:
    a first terminal device receiving signaling from a server for initiation of a communication session with a second terminal device, at least one of redirection target information and redirection timer information being received from the server in association with the received signaling;
    the first terminal device determining an offset amount based upon the redirection timer information, the offset amount being added or subtracted to a redirection timer value to determine a modified redirection timer value that takes into account time that elapses between messaging exchanged between the server and the first terminal device that affects the first terminal device determination of an amount of time remaining in a redirection timer of the server such that the determined modified redirection timer value is equal in value or substantially equal in value to the amount of time remaining in the redirection timer of the server; and
    the first terminal device displaying the modified redirection timer value when outputting an indication of the received signaling for initiating the communication session.

2. The method of claim 1, wherein the offset amount is determined by the first terminal device identifying an amount of registration time that elapsed between when a registration request message was sent from the first terminal device to the server and when a registration response message sent by the server that responded to the registration request message was received by the first terminal device and dividing the amount of registration time in half to identify a value for the offset amount.

3. The method of claim 2, wherein the redirection timer information is comprised of information identifying an initial starting time of the redirection timer of the server, the server counting down time from the initial starting time.

4. The method of claim 3, further comprising:
the server initiating the counting down of the redirection timer of the server upon sending of the signaling to the first terminal device or the server receiving confirmation from the first terminal device that confirms receipt of the signaling sent by the server; and
the first terminal device displaying indicia identifying a target device to which a redirection of the communication session is to be directed upon expiration of the redirection timer of the server.

5. The method of claim 4, wherein the redirection timer information also comprises information indicating that the server initiates counting down of the initial starting time of the redirection timer of the server upon one of (a) receipt of confirmation of the signaling sent to the first terminal device and (b) the sending of the signaling to the first terminal device.

6. The method of claim 2, further comprising the first terminal device counting down the modified redirection timer value and displaying the counting down of the modified redirection timer value.

7. The method of claim 2, further comprising:
the first terminal device receiving input to pause counting down of the redirection timer of the server; and
the first terminal device sending a pause message to the server such that the server pauses counting down the redirection timer of the server.

8. A method of establishing a communication session between a first terminal device and a second terminal device comprising:
a first terminal device receiving signaling from a server for initiation of a communication session with a second terminal device, at least one of redirection target information and redirection timer information being received from the server in association with the received signaling;
the first terminal device determining a first offset amount based upon the redirection timer information, the first offset amount being added or subtracted to a redirection timer value to determine a modified redirection timer value that takes into account time that elapses between messaging exchanged between the server and the first terminal device that affects the first terminal device determination of an amount of time remaining in a redirection timer of the server such that the determined modified redirection timer value is equal in value or substantially equal in value to the amount of time remaining in the redirection timer of the server; and
the first terminal device displaying the modified redirection timer value when outputting an indication of the received signaling for initiating the communication session; and
the first terminal device receiving input to resume counting down of the redirection timer of the server;
the first terminal device sending a resume message to the server such that the server ceases the pausing of the counting down of the redirection timer of the server and resumes the counting down of the redirection timer of the server; and
one of:
(a) the first terminal device determining a second offset amount, the second offset amount being added or subtracted to a paused value of the modified redirection timer to take into account time that elapses between messaging exchanged between the server and the first terminal device that affects the first terminal device determination of an amount of time remaining in the redirection timer of the server and subsequently resuming counting down of the modified redirection timer value and displaying indicia identifying the counting down of the modified redirection timer value,
(b) the first terminal device resuming counting down of the modified redirection timer value after an amount of time equivalent to the first offset amount passes and displaying indicia identifying the counting down of the modified redirection timer value, and
(c) the first terminal device determining a second offset amount to take into account time that elapses between messaging exchanged between the server and the first terminal device that affects the first terminal device determination of an amount of time remaining in the redirection timer of the server and resuming counting down of the modified redirection timer value after an amount of time equivalent to the second offset amount passes.

9. The method of claim 8 wherein the first offset amount is equal to a value that is half of an amount of time that elapsed between when the first terminal device sent a registration request message to the server and when the first terminal device received a registration response message from the server and wherein the second offset amount is equal to the amount of time that elapsed between when the first terminal device sent the registration request message to the server and when the first terminal device received the registration response message from the server.

10. The method of claim 9 further comprising:
the first terminal device determining a state of the first terminal device when the signaling from the server to initiate the communication session is received;
upon a determination that the state of the first terminal device is a predefined state to which additional redirection time is needed, the first terminal device sending an additional time message to the server such that the server adds a predetermined amount of time to the redirection timer so that an amount of time remaining in the redirection timer includes the predefined amount of time identified in the additional time message.

11. The method of claim 8 wherein the first terminal device is configured to determine the second offset amount, the second offset amount being added or subtracted to a paused value of the modified redirection timer to take into account time that elapses between messaging exchanged between the server and the first terminal device that affects the first terminal device determination of an amount of time remaining in the redirection timer of the server and subsequently resuming counting down of the modified redirection timer value and displaying indicia identifying the counting down of the modified redirection timer value.

12. The method of claim 8 wherein the first terminal device is configured to resume the counting down of the modified redirection timer value after the amount of time equivalent to the first offset amount passes and displaying indicia identifying the counting down of the modified redirection timer value.

13. The method of claim 8 wherein the first terminal device is configured to determine the second offset amount to take into account time that elapses between messaging exchanged between the server and the first terminal device that affects the first terminal device determination of an amount of time remaining in the redirection timer of the server and resuming counting down of the modified redirection timer value after the amount of time equivalent to the second offset amount passes.

14. A communication system comprising:
   a first terminal device; and
   a server communicatively connectable to the first terminal device;
   the server configured to signal to the first terminal device to initiate a communication session requested by a second terminal device, the server configured to send at least one of redirection target information and redirection timer information in association with the signaling;
   the first terminal device configured to determine a first offset amount based upon the redirection timer information, the first offset amount being added or subtracted to a redirection timer value to determine a modified redirection timer value that takes into account time that elapses between messaging exchanged between the server and the first terminal device that affects the first terminal device determination of an amount of time remaining in a redirection timer of the server such that the determined modified redirection timer value is equal in value or substantially equal in value to the amount of time remaining in the redirection timer of the server; and
   the first terminal device configured to display the modified redirection timer value when displaying an indication of the received signaling for initiating the communication session;
   the first terminal device configured to receive input to pause counting down of the redirection timer of the server;
   the first terminal device configured to send a pause message to the server such that the server pauses counting down the redirection timer of the server;
   the first terminal device configured to receive input to resume counting down of the redirection timer of the server;
   the first terminal device configured to send a resume message to the server such that the server ceases the pausing of the counting down of the redirection timer of the server and resumes the counting down of the redirection timer of the server; and
   one of:
      (a) the first terminal device configured to determine a second offset amount, the second offset amount being added or subtracted to a paused value of the modified redirection timer to take into account time that elapses between messaging exchanged between the server and the first terminal device that affects the first terminal device determination of an amount of time remaining in the redirection timer of the server and subsequently resuming counting down of the modified redirection timer value and displaying indicia identifying the counting down of the modified redirection timer value,
      (b) the first terminal device configured to resume counting down of the modified redirection timer value after an amount of time equivalent to the first offset amount passes and displaying indicia identifying the counting down of the modified redirection timer value, and
      (c) the first terminal device configured to determine a second offset amount to take into account time that elapses between messaging exchanged between the server and the first terminal device that affects the first terminal device determination of an amount of time remaining in the redirection timer of the server and resuming counting down of the modified redirection timer value after an amount of time equivalent to the second offset amount passes.

15. The system of claim 14 wherein the first offset amount is equal to a value that is half of an amount of time that elapsed between when the first terminal device sent a registration request message to the server and when the first terminal device received a registration response message from the server and wherein the second offset amount is equal to the amount of time that elapsed between when the first terminal device sent the registration request message to the server and when the first terminal device received the registration response message from the server.

16. A non-transitory computer readable medium having an application stored thereon, the application executable by a terminal device, the application defining a method performed by the terminal device when the terminal device executes the application, the method comprising:
   in response to the terminal device receiving signaling from a server to initiate a communication session requested by another terminal device,
   at least one of redirection target information and redirection timer information being received in association with the received signaling, the terminal device determining a first offset amount based upon the redirection timer information, the first offset amount being added or subtracted to a redirection timer value to determine a modified redirection timer value that takes into account time that elapses between messaging exchanged between the server and the terminal device that affects the terminal device determination of an amount of time remaining in a redirection timer of the server such that the determined modified redirection timer value is equal in value or substantially equal in value to the amount of time remaining in the redirection timer of the server; and
   the terminal device displaying the modified redirection timer value when displaying an indication of the received signaling for initiating the communication session;
   the terminal device receiving input to pause counting down of the redirection timer of the server;
   the terminal device sending a pause message to the server such that the server pauses counting down the redirection timer of the server;
   the terminal device receiving input to resume counting down of the redirection timer of the server;
   the terminal device sending a resume message to the server such that the server ceases the pausing of the counting down of the redirection timer of the server and resumes the counting down of the redirection timer of the server; and
   one of:
      (a) the terminal device determining a second offset amount, the second offset amount being added or subtracted to a paused value of the modified redirection timer to take into account time that elapses between messaging exchanged between the server and the terminal device that affects the first terminal device determination of an amount of time remaining in the redirection timer of the server and subsequently resuming counting down of the modified redirection timer value and displaying indicia identifying the counting down of the modified redirection timer value, (b) the terminal device resuming counting down of the modified redirection timer value after an amount of time equivalent to the first offset amount passes and displaying indicia identifying the counting down of the modified redirection timer value, and (c) the terminal device determining a second offset amount to take into account time that elapses between messaging exchanged between the server and the terminal device that affects the terminal device determination of an amount of time remaining in the redirection timer of the server and resuming counting down of the modified redirection timer value after an amount of time equivalent to the second offset amount passes.

17. The non-transitory computer readable medium of claim 16 wherein the terminal device determines the second offset amount, the second offset amount being added or subtracted to the paused value of the modified redirection timer to take into account time that elapses between messaging exchanged between the server and the terminal device that affects the first terminal device determination of the amount of time remaining in the redirection timer of the server and subsequently resuming counting down of the modified redirection timer value and displaying indicia identifying the counting down of the modified redirection timer value.

18. The non-transitory computer readable medium of claim 16 wherein the terminal device determines the second offset amount to take into account time that elapses between messaging exchanged between the server and the terminal device that affects the terminal device determination of the amount of time remaining in the redirection timer of the server and resuming counting down of the modified redirection timer value after the amount of time equivalent to the second offset amount passes.

* * * * *